United States Patent [19]

Matovich

[11] Patent Number: 4,491,452
[45] Date of Patent: Jan. 1, 1985

[54] LOAD TRANSPORTING APPARATUS

[76] Inventor: Mitchel J. Matovich, 2323 Eastridge #511, Menlo Park, Calif. 94025

[21] Appl. No.: 433,225

[22] Filed: Oct. 7, 1982

[51] Int. Cl.³ .............................................. B60B 29/00
[52] U.S. Cl. .................................... 414/427; 414/458; 414/459; 254/7 R; 254/89 R; 254/4 R
[58] Field of Search ................ 254/2 C, 7 R, 4 R, 45, 254/47, 89 R, 92, 103, 296, 152; 414/427, 458, 459

[56] References Cited

U.S. PATENT DOCUMENTS

| | | | |
|---|---|---|---|
| 3,035,812 | 5/1962 | Wineteer | 254/89 R |
| 3,139,266 | 6/1964 | Tew | 254/47 |
| 3,672,634 | 6/1972 | Chaffin | 254/2 C |
| 4,278,244 | 7/1981 | Carter | 269/152 |

FOREIGN PATENT DOCUMENTS 601347 1/1960 Italy .................................... 254/7 R Primary Examiner—Frederick R. Schmidt
Assistant Examiner—Judy J. Hartman
Attorney, Agent, or Firm—Thomas H. Olson

[57] ABSTRACT

Load lifting and transporting apparatus which comprises plural individual units that can be combined into a configuration corresponding to the configuration of the load. There are load lifting units equipped with a jack screw and there are load engaging units equipped with plates for engaging the load. Each of the units is provided with sleeves through which elongate bars can be introduced to retain the lifting and engaging units in a framework surrounding the load. The load engaging units can be provided in various forms such as a unit with a plate that can be positioned beneath the periphery of a rigid load, a unit having flexible belts or the like that can be passed beneath irregularly shaped loads, a unit specifically adapted to pass beneath the wheels of a vehicle, and a unit including a truss that can be positioned above a load.

11 Claims, 8 Drawing Figures

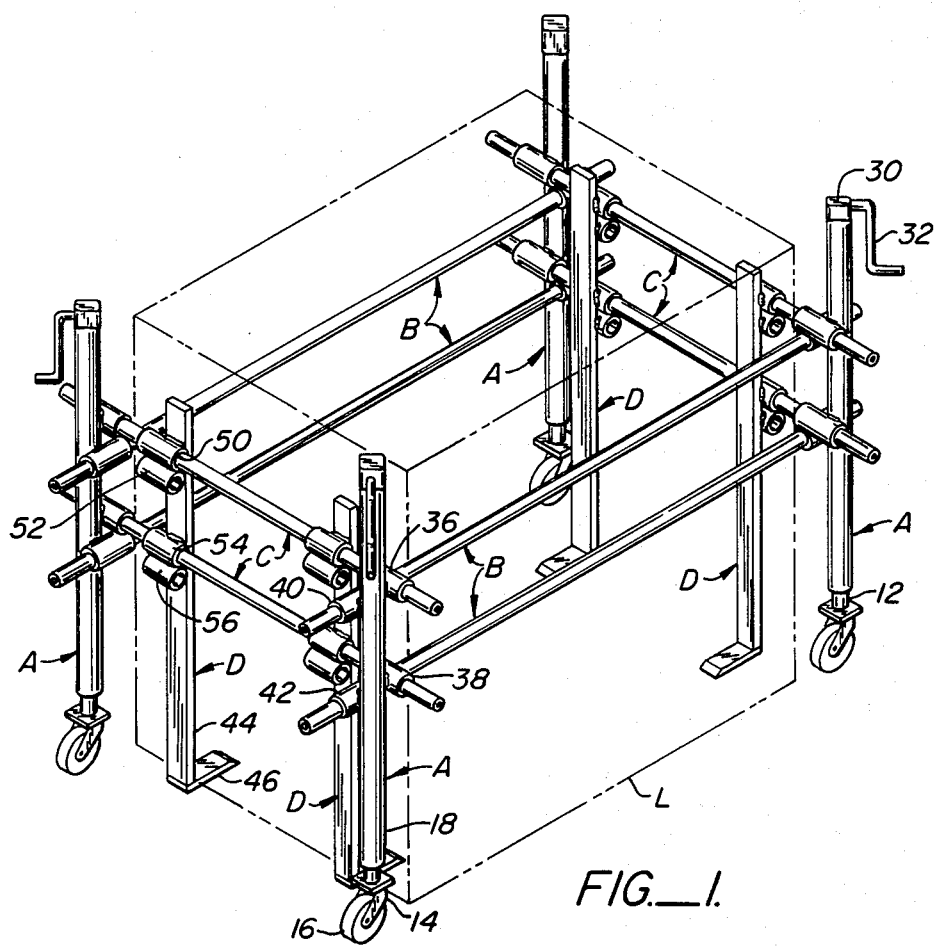
FIG._1.
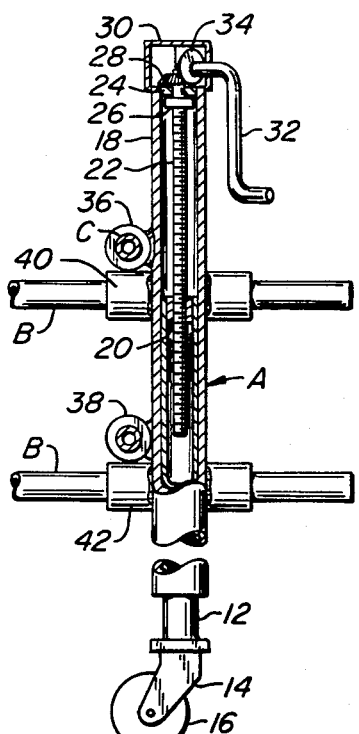
FIG._2.
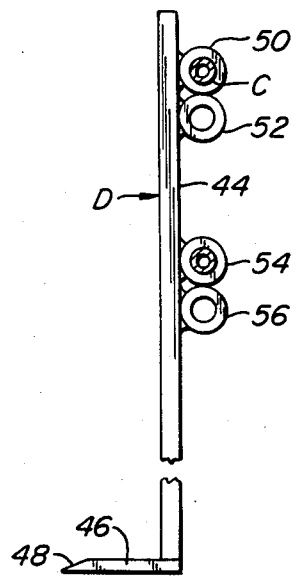
FIG._3.

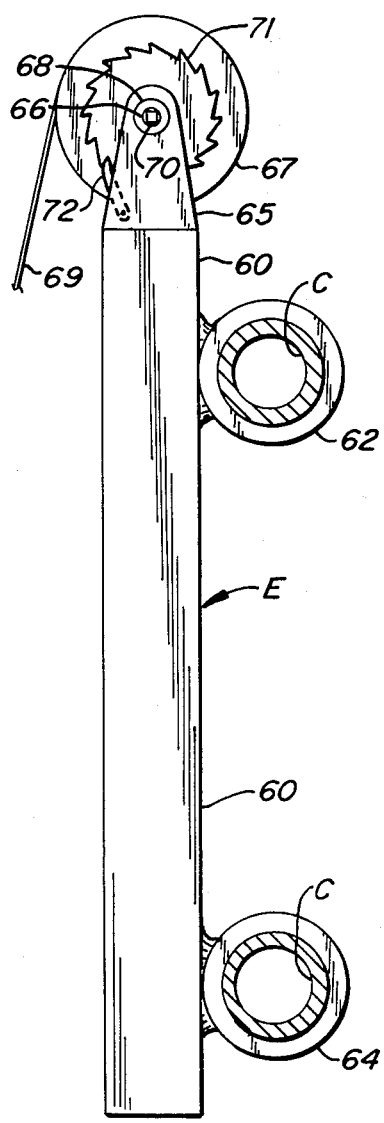
FIG._4.
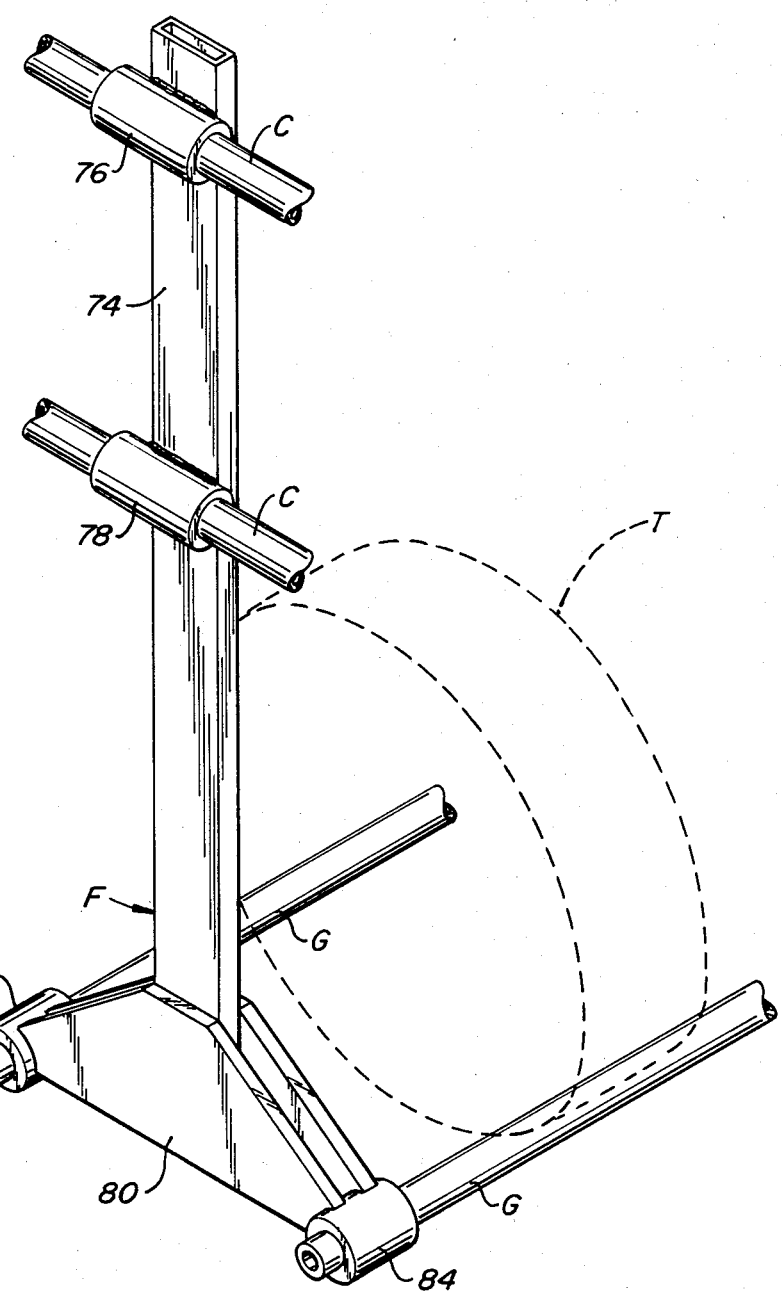
FIG._5.

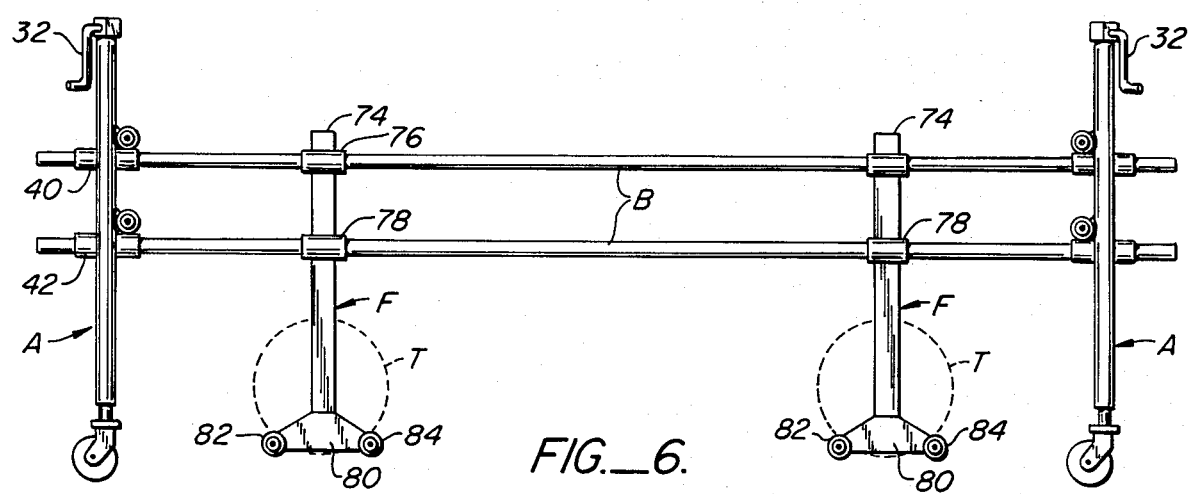
FIG._6.
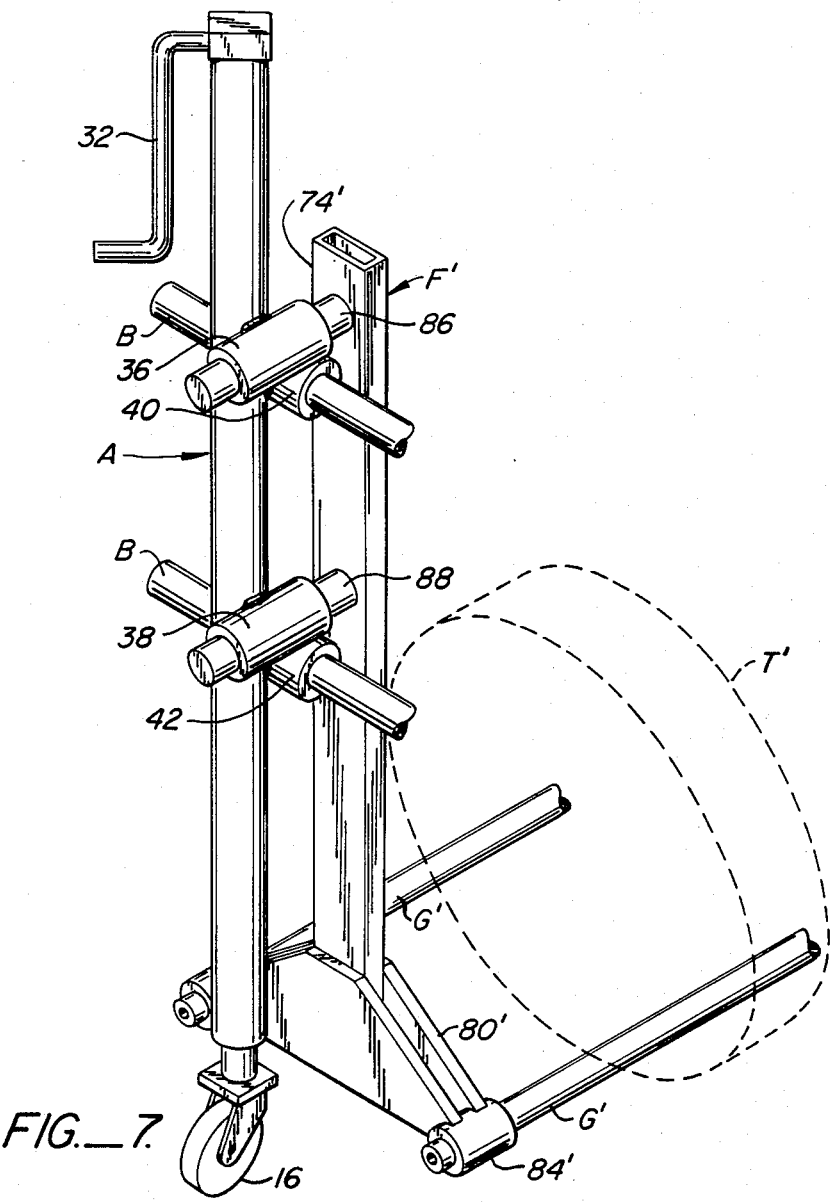
FIG._7.

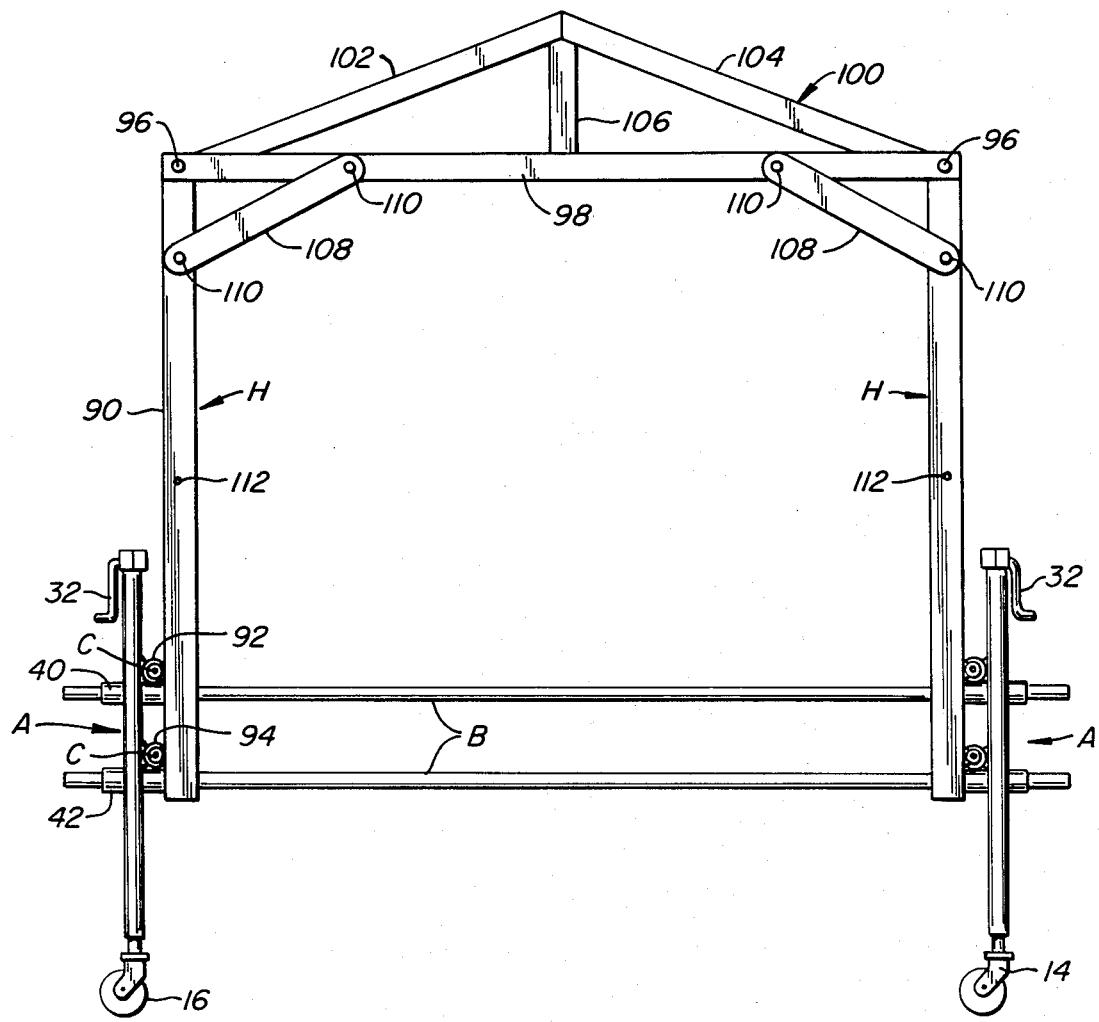
FIG._8.

LOAD TRANSPORTING APPARATUS

BACKGROUND OF THE INVENTION

1. Field of the Invention

This invention relates to load transporting apparatus that is capable of transporting irregularly shaped loads and that can be disassembled in order that the apparatus can be conveniently carried to roofs and like locations of difficult access.

2. Description of the Prior Art

A typical example of the need to move a heavy load in a location to which access is difficult is a large air conditioning unit located on the roof of a tall building. The unit typically weighs several tons, and it has been the practice in the past to employ a helicopter when it is necessary to move such units. This practice is both expensive and dangerous.

The known prior art discloses apparatus for lifting heavy equipment and transporting the equipment. Typically, such apparatus employs a frame work that is either fixed in size or adjustable over a relatively small range. Exemplifying such prior art apparatus are the disclosures of U.S. Pat. Nos. 2,450,690; 3,486,650; 3,672,634 and 3,768,676.

U.S. Pat. No. 3,327,996 discloses a unit which combines a lifter and a caster supported base. Two or more of the devices can be placed on opposite sides of a load in order to lift and transport the load so long as the load has sufficient rigidity to maintain the unit in an upright operative position.

SUMMARY OF THE INVENTION

In accordance with the present invention there are two types of subassemblies which can be combined to lift and transport a load of virtually any dimension or weight. Each of the individual subassemblies is sufficiently light in weight, however, that it can be carried to any location at which transportation of a load is desired.

One of the subassemblies is a lifting unit that has a caster supported rigid elongate member upon which is telescoped an outer member. An adjusting or jacking mechanism is provided interior of the members so that they can be axially expanded or contracted. Two sleeves are mounted on the outer member. The sleeves define passages that extend in a direction perpendicular to the longitudinal axis of the members. The passages are shaped to receive bars or pipes of suitable length and diameter.

The other subassembly is a load engaging unit constituted by a rigid member having a load engaging projection or other fixture on it. The load engaging unit also has two sleeves which define passages equivalent to previously mentioned passages and spaced from one another by the same distance as the passages in the lifting unit. Thus, bars or pipes can be extended through the passages on the units to retain them in a desired assembled relation.

In employing the apparatus to lift a load, it is usual to combine two or more of the lifting units with two or more of the load engaging units along with an appropriate number of bars or pipes so that the load is entirely circumscribed.

An object of the invention is to provide load lifting apparatus that can be accommodated to virtually any size load. This object is achieved by providing on each of the units a pair of spaced apart sleeves which define uniform passages through which bars, pipes, or rods of any suitable length can be fitted.

Another object is to provide apparatus of the type described that can be adapted for transporting loads of virtually any shape. This object is achieved by providing differently configured load engaging units. One form of load engaging unit has a plate which can be inserted beneath the load at the edge of the load. Another form of unit supports webbing or a like flexible tension member that can be passed beneath a load of almost any shape. A further load engaging unit, which is adapted for lifting vehicle, has devices which engage the vehicle tires. Yet another load engaging unit employs one or more horizontally extending trusses from which a load can be suspended or upon which a load can be supported.

The foregoing, together with other objects, features and advantages, will be more apparent after referring to the following specification and the accompanying drawings.

BRIEF DESCRIPTION OF THE DRAWINGS

FIG. 1 is a perspective view of lifting apparatus according to the invention in operative condition.

FIG. 2 is an elevation view of a lifting unit that constitutes part of the apparatus of FIG. 1.

FIG. 3 is an elevation view of a load engaging unit that constitutes part of the apparatus of FIG. 1.

FIG. 4 is an elevation view of an alternate form of load engaging unit particularly suited for irregularly shaped objects.

FIG. 5 is a perspective view of another alternate form of load engaging unit specifically adapted to lifting wheeled vehicles.

FIG. 6 is a side elevation view showing the load engaging unit of FIG. 5 in operative condition.

FIG. 7 is a modified form of load lifting unit for wheeled vehicles.

FIG. 8 is an elevation view of a pair of load engaging units and a truss supported thereby.

DETAILED DESCRIPTION OF THE PREFERRED EMBODIMENTS

Referring more particularly to the drawings and specifically to FIG. 1, reference character L indicates a load that can be lifted and transported by apparatus according to the invention. There are four identical lifting units A which are positioned at the corners of load L. Lifting units A are supported with respect to one another by pairs of longitudinally extending rigid bars B, and pairs of transversely extending rigid bars C. Carried by transversely extending bars C are four identical load engaging units D.

Referring to FIG. 2, each lifting unit A includes a rigid member 12, which has fixed to its lower end a caster composed of a swivel support 14 and a wheel 16. The end of rigid member 12 opposite the caster telescopes into a hollow rigid outer member 18 such that members 12 and 18 are relatively axially movable. There is a mechanism for effecting relative axial movement between inner rigid member 12 and outer rigid member 18. The mechanism includes a sleeve 20 which is welded or otherwise suitably affixed to the upper end of inner rigid member 12. Sleeve 20 defines an internally threaded opening therethrough; a threaded jack screw 22 has threads meshed with the threads in sleeve 20 so that rotation of the jack screw moves the jack screw axially of sleeve 20 and inner member 12. Jack screw 22 extends to the upper extremity of outer member 18. Fixed to the interior of such upper extremity is a block 24 which defines a clearance hole for jack screw 22. Below block 24 and rigid with the jack screw is a thrust shoulder 26. On the upper surface of block 24 a bevel gear 28 is fixed to jack screw 22. A housing 30 is fastened to the upper extremity of outer member 18 and supports a hand crank 32. The inner end of hand crank 32 has a bevel gear 34 which cooperates with bevel gear 28 so that in response to the rotation of hand crank, jack screw 22 experiences corresponding rotation thereby effecting selective axial movement of outer member 18 with respect to inner member 12.

Fixed to the external surface of outer member 18 is a first upper sleeve 36 and a second lower sleeve 38. The sleeves define passages which are of cylindrical shape in the embodiment shown in the drawings, because the sleeves are formed of pipe lengths of suitable diameter, e.g. two inches. The passages defined by sleeves 36 and 38 are parallel to one another and are perpendicular to the longitudinal axis of inner member 12 and outer member 18. Also secured to the external surface of outer member 18 is a third upper sleeve 40 and a fourth lower sleeve 42. Sleeves 40 and 42 are identical to sleeves 36 and 38 but are perpendicular or orthogonal to the latter sleeves.

Referring to FIG. 3, load engaging unit D includes a rigid upright 44 to the lower end of which is fixed a load engaging plate 46. Plate 46 extends transversely of upright 44 and has at the edge remote from the upright a bevelled edge portion 48 to facilitate entry of plate 46 beneath load L.

Secured to upright 44 on the side thereof opposite from which load engaging plate 46 extends are a pair of upper sleeves 50 and 52 and a pair of lower sleeves 54 and 56. Sleeves 50–56 define parallel passages. Sleeves 50 and 52 are spaced from one another in correspondence with the spacing between sleeves 36 and 38 on lifting unit A so as to receive elongate bars C therethrough. Sleeves 52 and 56 are spaced from one another in correspondence to sleeves 40 and 42 on lifting unit A so as to engage elongate bars B. Consequently, load engaging units D can be placed at various positions around the periphery of load L to engage the load at plural sites.

In one specific structure designed in accordance with the present invention the sleeves secured to the exterior of lifting unit A and load engaging D are formed of nominal two inch steel pipe. Elongate bars B and c are formed of nominal one and one-half inch steel pipe, which has an outer diameter such as to slidably fit within the passages defined by the sleeves. That the latter pipe is readily available constitutes an advantage afforded by the invention because pipes of virtually any length to accomodate loads of virtually any dimension can be readily acquired. The pipes that constitute elongate bars B and C are individually of relatively light weight, as are the individual lifting units A and load engaging units D, so that apparatus according to the invention can be utilized at remote sites to which vehicle access is not feasible.

In a typical use of the invention, four lifting units A and four load engaging units D are transported to the site of the load along with an appropriate number of elongate bars B and C. If the load to be transported is at a location to which access is difficult, the individual units can be transported individually. At the site of the load to be transported, load engaging units D are positioned so that load engaging plates 46 reside beneath the edge of periphery of the load.

The load engaging units D can be placed under two opposite edges of the load, or can be placed under all edges of the load. Next, elongate bars C are introduced into sleeves 50 and 54 of the load engaging units. Then sleeves 36 and 38 of lifting units A are telescoped on to the protruding ends of rigid bars C. The lifting units are slid onto the protruding ends of rigid bars C by a distance such that the passages defined by sleeves 40 and 42 are outward of the side surfaces of the load. After all four lifting units A are thus positioned, longitudinally extending rigid bars B are inserted through sleeves 40 and 42 of opposing pairs of lifting units. If there is a load engaging unit D on the longitudinal side of the load, rigid bars B are also introduced through sleeves 52 and 56 of such load engaging unit.

With the apparatus postioned as described next above, hand cranks 32 of the four load lifting units are rotated in a direction such as to cause outer rigid members 18 and the sleeves secured thereto to raise with respect to inner units 12. Load L experiences a corresponding movement. The forces imposed on the parts of the device by the weight of Load L are almost always sufficient to prevent relative axial movement between rigid bars B and C and the sleeves in which they reside; set screws can be provided in the walls of the sleeves, however, if additional rigidity between the rigid bars and the sleeves is needed. After the load has been elevated as described above, it can be moved over the surface by virtue of the presence of casters 16. When the load reaches a desired location, it can be lowered by cranking cranks 32 in the opposite direction and disassembling the various parts in an order opposite that described above.

In the case where load L is a rigid body, longitudinally extending bars B can be supplanted by flexible belts that extend between lifting units A on opposite longitudinal ends of the load. It is preferred that two belts be used between each pair of lifting units, one belt wrapped around the portions of outer member 18 between sleeve 36 and housing 30 and between sleeve 42 and the lower extremity of outer member 18. The straps are preferably provided with buckles or the like so that the straps can be tightened to draw load lifting units A toward one another and thus retain load engaging units D in load engaging relation to the load.

The invention also lends itself to lifting and transporting differently shaped articles such as cylindrical or spherical tanks. For lifting such nonrectangular loads, there is a load engaging unit E shown in FIG. 4. Load engaging unit E includes a rigid upright 60 to one side surface of which are attached an upper sleeve 62 and a lower sleeve 64. The sleeves define passages which are parallel to one another and perpendicular to the longitudinal axis of upright 60. Sleeves 62 and 64 are spaced from one another by a distance corresponding to the spacing between sleeves 36 and 38 of lifting unit A so that rigid bars B or C can be introduced through the sleeves to support load engaging units E. To the upper end of upright 60 are fixed two parallelly spaced apart support plates, one of which is seen at 65. Supported by the support plates and spanning the space therebetween is a shaft 66 on which a spool 67 is supported. The support plates have bushings 68 so that shaft 66 and spool 67 can rotate. Wound upon spool 67 is a flexible tension resisting member such as webbing 69.

Exterior of plate 65 shaft 66 is formed with a noncircular portion 70 so that a tool, such as a wrench, can be employed to grasp the shaft and effect rotation of the shaft and spool to wind webbing 69 on to the spool. Secured for rotation with the spool is a ratchet 71 with which a pawl 72 cooperates to selectively lock spool 67 against rotation. Pawl 72 is pivotally mounted on support plate 65 so that it can be released when it is desired to unwind webbing 69 from the spool. The opposite end of webbing 69 is secured to an identical load engaging unit E so that when two load engaging units E are mounted on opposite pairs of rigid bars C, supported by respective pairs of lifting units A, the central portion of webbing 69 can be passed beneath a nonrectangular or irregularly shaped load so that such load can be lifted and transported with the apparatus of the invention. Lifting can be achieved either by applying a wrench to the noncircular portion 70 of shaft 66 or by rotating cranks 32 on respective lifting units A.

One environment in which apparatus according to the invention is particularly useful is in positioning automobiles within crowded automobile showrooms, where it is frequently not possible to drive a given automobile to the desired position. A load engaging unit F specifically adapted for engaging vehicle wheels is depicted in FIGS. 5 and 6. Load engaging unit F includes a rigid upright 74 on the external surface which are fixed an upper sleeve 76 and a lower sleeve 78. The sleeves define mutually parallel passages, which are perpendicular to the longitudinal axis of upright 74. The sleeves are spaced from one another by a distance corresponding to the space between sleeves 40 and 42 on lifting units A so that load engaging unit F can be employed with the lifting units and with rigid bars B or C. At the lower extremity of upright 74 is secured a yoke 80 which has extremities extending from opposite sides of the upright in directions substantially parallel to the passages defined by sleeves 76 and 78. At the extremities of yoke 80 respective sleeves 82 and 84 are fixed. The latter sleeves define passages that are perpendicular to the passages in sleeves 76 and 78 so that the passages in sleeves 82 and 84 can receive crossbars G which can be of the same material as rigid bars B and C. The spacing between the passages defined by sleeves 82 and 84 is established so that crossbars G can reside beneath sites that are forward and rearward of the point of contact between a vehicle tire T and the surface on which it rests; the spacing between the sleeve passages is less, however, than the diameter of a typical vehicle tire.

Four load engaging units F are employed with two pairs of crossbars G in lifting and transporting a vehicle. Referring to FIG. 6, a pair of load engaging units F are installed with two rigid bars C extending through respective upper sleeves 76 and lower sleeves 78. Rigid bars C are of a length such that with the load engaging units F in alignment with the front and rear vehicle axles, portions of the rigid bars will protrude exteriorally of the load engaging unit. To the protruding portions of rigid bars C load lifting units A are mounted. With two subassemblies formed as described immediately above and disposed on opposite sides of the vehicle, crossbars G are inserted through passages formed by sleeves 82 and 84 on one engaging unit and engaged in the sleeves of the other load lifting unit on the opposite side of the vehicle. With the apparatus thus in place, rotation of cranks 32 on the load lifting units A raises tires T from the floor surface and the vehicle can then be positioned in any desired position, notwithstanding limitations on space in front of and to the rear of the vehicle. When the vehicle has been placed at a desired location, cranks 32 can be rotated in the opposite direction to lower the tires to the floor so that the apparatus can be removed, disassembled and carried away.

A modified form of a load engaging unit for vehicle wheels is identified in FIG. 7 as F'. Because many components of load engaging unit F correspond in structure and function to components in load engaging unit F, corresponding reference numerals for such corresponding components are used in FIG. 7 with the addition of a prime ('). There is a rigid upright 74' to the lower end of which is secured a yoke 80' which has extremities on opposite sides of upright 74'. The extremities have sleeves, one of which is seen at 84'. There is an opposite sleeve which is not seen in FIG. 2. The sleeves define passages for receiving crossbars G' as described previously in connection with FIGS. 5 and 6. Protruding laterally from the outer surface of upright 74' are stub shafts 86 and 88. The stub shafts extend in a direction perpendicular to rigid member 74' and parallel to the passages defined by sleeve 84' and its counterpart on the opposite side of the upright. The stub shafts are spaced from one another by a distance corresponding to the distance between sleeves 36 and 38 on lifting unit A. Accordingly, the load engaging unit F' can be supported directly on the lifting unit A rather than being spaced from the lifting unit as shown in FIG. 6. Elongate bars B' are installed in sleeves 40 and 42 to join a lifting unit associated with the rear vehicle wheels with a unit associated with the front vehicle wheels. Because installation and use of lifting unit F' is substantially identical to that previously described in connection with FIGS. 5 and 6, no further description of the latter lifting unit will be given.

A further alternate form of load engaging unit is identified by reference character H in FIG. 8. Load engaging unit H includes an elongate upright 90 adjacent the lower end of which are fixed an upper sleeve 92 and a lower sleeve 94. The sleeves define horizontally extending passages that are spaced apart from one another by an amount corresponding to the space between sleeves 36 and 38 on lifting unit A. The upper or distal end of elongate upright 90 is formed with a hole to receive a locking pin 96. A horizontal member 98 of a truss 100 has at its opposite ends holes adapted to register with the holes in the upper ends of elongate uprights 90 so that installation of locking pins 96 through the registered holes will secure the truss to the upper extremities of two load engaging units H. The inclusion in truss 100 of obliquely extending beams 102 and 104 and a vertical beam 106, which extends between the apex of the oblique beams and the midpoint of horizontal member 98, affords rigidity and load bearing capacity to the truss. There are corner braces 108, each of which has a hole in either end; truss member 98 and rigid uprights 90 have appropriately positioned holes so that locking pins 110 can be introduced into the holes to support braces 108 and afford further rigidity to the assembled structure.

At a level below the upper extremity of elongate uprights 90 each of the uprights defines a hole 112. The hole is sized to receive locking pins 96 so that truss 100 can be installed at a lower level corresponding to that of holes 112. The truss can be installed in the position shown in FIG. 8 or in the alternative can be inverted so as to present an upward flat surface upon which boards, panels or the like can be laid to form a lifting or supporting platform.

In a typical use of the load engaging unit seen in FIG. 8, a rectangular framework is formed by using four lifting units A and an appropriate number and length of elongate bars B and C as shown in the figure. If a load is to be lifted by use of a cable, rope or chain, such can be wrapped around both the load and truss 100 and can be raised by manipulation of hand cranks 32 in lifting units A. After the load is free of the surface upon which the caster wheels 16 rest, it can be transported upon the surface to any suitable location.

Thus, it will be seen that the present invention provides a load transporting apparatus which is composed of a number of individual parts and which can be assembled in synergistic relationship at virtually any lifting site. This aspect of the invention permits utilization of the apparatus at sites that are not accessible to trucks, hoists and like conventional lifting equipment. Because of the variety of load engaging units provided in accordance with the invention, loads of virtually any shape and size can be transported. Moreover, the presence of passage defining sleeves on all load lifting and load engaging units enables the user to employ elongate bars B and C of any suitable length. Because the passages defined by the sleeves are preferably cylindrical, conventional piping can be employed for the elongate bars.

Although several embodiments of the invention have been shown and described, it will be obvious that other adaptations and modifications can be made without departing from the true spirit and scope of the invention.

What is claimed is:

1. Apparatus for transporting a load upon a surface comprising at least one lifting unit, at least one load engaging unit and at least two rigid elongate bars for joining the lifting unit and the load engaging unit; said lifting unit comprising a rigid inner member having a first end and a second end remote from said first end, means secured to said first end for affording rolling movement of said rigid member upon said surface, a hollow rigid outer member telescoped over said second end for relative axial movement with respect to said inner member, means for selectively axially moving said outer member with respect to said inner member in a direction toward and away from said rolling movement affording means, first and second sleeves secured to the exterior of said outer member in spaced apart relation, said sleeves each defining a passage of substantially uniform cross section, the passages of respective said sleeves being mutually parallel and being substantially perpendicular to and outward of said outer member; said load engaging unit including a rigid elongate member having an end, means secured to said end and projecting laterally of said member for engaging the load, third and fourth sleeves mounted to said rigid elongate member in spaced relation to said load engaging means, said third and fourth sleeves being spaced from one another by a distance substantially equal to the space between first and second sleeves, said third and fourth sleeves defining passages of substantially the same cross sectional shape as the passages in said first and second sleeves, the passages in said third and fourth sleeves being parallel to one another and substantially perpendicular to said rigid elongate member; said rigid elongate bars each having an external cross sectional shape slidably receivable in said passages so that said lifting unit and said load engaging unit can be joined together at a range of distances by installation of one of said bars through said first and third sleeves and installation of the other bar through said second and fourth sleeves.

2. Apparatus according to claim 1 wherein said lifting unit includes fifth and sixth sleeves secured to the exterior of said outer member adjacent respective said first and second sleeves, said fifth and sixth sleeves each defining a passage of substantially uniform cross-section, said fifth and sixth sleeves being oriented so that the passages defined thereby are substantially orthogonal to the passages defined by said first and second sleeves so that said rigid elongate bars can extend from said lifting unit in orthogonal directions.

3. Apparatus according to claim 2 wherein said load engaging unit includes seventh and eighth sleeves secured to said rigid elongate member adjacent respective said third and fourth sleeves, said seventh sand eighth sleeves each defining a passage of substantially uniform cross-section, last said passages being substantially parallel to the passages defined by said third and fourth sleeves, the passages defined by said seventh and eighth sleeves being spaced from one another by a distance corresponding to the space between the passages defined by said fifth and sixth sleeves on said load lifting units so that two of said load engaging units can engage a load at orthogonal regions of the load with the laterally projecting load engaging means of respective said load engaging units being at substantially the same height.

4. Apparatus according to claim 1 wherein the passages defined by said sleeves are cylindrical passages and wherein said rigid elongate bars have a cylindric external shape size to slidably enter said sleeve passages.

5. Apparatus according to claim 1 wherein said load engaging means on said load engaging unit includes a flat plate extending substantially normal to said rigid elongate member, said plate having an edge remote from said member, said edge being bevelled to facilitate entry of said plate beneath a load.

6. Apparatus according to claim 1 wherein said load engaging means includes a spool, means attached to said rigid elongate member for supporting said spool for rotation about an axis, means for selectively preventing rotation of said spool on said axis, and a flexible elongate tension member engaged with said spool so that said tension member is wrapped around said spool in response to rotation of said spool, said tension member having a free end distally of said spool for passage under a load to be lifted.

7. Apparatus according to claim 1 wherein said load engaging means includes a yoke having a first extremity extending laterally of said rigid elongate member in one direction and a second extremity extending from said rigid elongate member in an opposite direction, first and second socket members secured adjacent respective said extremities, said socket members defining mutually parallel passages that extend generally normal to said rigid elongate member, and third and fourth bars receivable in said socket mebers so that portions of said third and fourth bars remote from said sockets can be placed beneath a load.

8. Appratus according to claim 1 wherein said load engaging means include an extension rigid with said rigid elongate member and substantially co-axial therewith, said extension having a distal end portion remote from said rigid elongate member, and attachment means secured to said distal end portion for effecting attachment of a load at a height above said surface.

9. Apparatus according to claim 8 wherein said attachment means includes a truss having a rigid horizontal member, said horizontal member having holes in opposite ends thereof, said distal portion of said load engaging means having a hole of corresponding size and a pin adapted to fit through said holes for attaching said truss to said extension.

10. Apparatus according to claim 9 wherein each said extension includes a second hole inward of said distal end, said second hole being sized to receive said pin in order to afford mounting of said truss at a height corresponding to said second holes.

11. Apparatus for lifting and transporting a wheeled vehicle of the type having at least two spaced apart co-axially mounted wheels comprising a pair of load lifting units each of which includes a rigid inner member having a first end and a second end remote from said first end, means secured to one longitudinal extremity of said first end for affording rolling movement of said rigid member upon said surface, a hollow rigid outer member telescoped over said second end for relative axial movement with respect to said inner member, means for selectively axially moving said outer member with respect to said inner member in a direction toward and away from said rolling movement affording means, first and second sleeves secured to said outer member in spaced apart relation, said sleeve each defining a passage of substantially uniform cross section, the passages of respective said sleeves being mutually parallel and being substantially perpendicular to said outer member; a pair of load engaging units, each of which includes a rigid elongate upright, a yoke secured to said upright and having a first extremity extending laterally from said upright in one direction and a second extremity extending from said upright in an opposite direction, first and second socket members secured adjacent respective said extremities, said socket members defining mutually parallel passages that extend generally normal to said upright, the passages defined by respective said socket members being spaced from one another by distance less than the diameter of said wheels, said upright having extending therefrom a pair of stub shafts sized for slidable engagement with the passages defined by the sleeves on said load lifting units, said stub shafts being spaced from said yoke and extending in a direction substantially parallel to said sockets, and a pair of rigid elongate cross bars having an exterior shape adapted to be slidably received in said sockets so that said cross bars can be placed beneath said wheel on opposite sides of the area contact between the wheel and a surface so that activation of said axial moving means in said load lifting units lifts said wheels from a surface on which the wheels reside.

* * * * *